US009327203B2

(12) United States Patent
Soheili (10) Patent No.: US 9,327,203 B2
(45) Date of Patent: May 3, 2016

(54) SYSTEMS AND METHODS FOR REAL TIME SOUND EFFECT MODULATION BASED ON ATTITUDE VARIATIONS

(71) Applicant: Ramin Soheili, San Francisco, CA (US)

(72) Inventor: Ramin Soheili, San Francisco, CA (US)

( * ) Notice: Subject to any disclaimer, the term of this patent is extended or adjusted under 35 U.S.C. 154(b) by 51 days.

(21) Appl. No.: 14/243,905

(22) Filed: Apr. 3, 2014

(65) Prior Publication Data

US 2014/0207266 A1    Jul. 24, 2014

(51) Int. Cl.
| | |
|---|---|
| *G06F 17/00* | (2006.01) |
| *A63H 3/28* | (2006.01) |
| *G06F 3/16* | (2006.01) |
| *A63H 17/32* | (2006.01) |
| *A63H 17/34* | (2006.01) |
| *A63H 19/14* | (2006.01) |

(52) U.S. Cl.
CPC ............... *A63H 3/28* (2013.01); *A63H 17/32* (2013.01); *A63H 17/34* (2013.01); *A63H 19/14* (2013.01); *G06F 3/165* (2013.01); *A63H 2200/00* (2013.01)

(58) Field of Classification Search
None
See application file for complete search history.

(56) References Cited

U.S. PATENT DOCUMENTS

| | | | | |
|---|---|---|---|---|
| 6,150,947 | A * | 11/2000 | Shima | 340/692 |
| 7,183,929 | B1 | 2/2007 | Antebi et al. | |
| 2001/0051488 | A1* | 12/2001 | Tachau | A63H 17/34 |
| | | | | 446/397 |
| 2002/0028427 | A1 | 3/2002 | Jurmain et al. | |
| 2005/0160902 | A1* | 7/2005 | Iwai et al. | 84/723 |
| 2006/0063466 | A1* | 3/2006 | Conarro | 446/26 |
| 2006/0111621 | A1* | 5/2006 | Coppi et al. | 600/300 |
| 2007/0186759 | A1* | 8/2007 | Bang et al. | 84/723 |
| 2009/0052677 | A1 | 2/2009 | Smith | |
| 2012/0227570 | A1 | 9/2012 | Chang et al. | |
| 2012/0244969 | A1* | 9/2012 | Binder | 473/570 |
| 2012/0263310 | A1 | 10/2012 | Fournel | |
| 2014/0007755 | A1* | 1/2014 | Henriques | 84/723 |

* cited by examiner

*Primary Examiner* — Fan Tsang
*Assistant Examiner* — David Siegel
(74) *Attorney, Agent, or Firm* — Georgiy L. Khayet (57) ABSTRACT

Provided are systems and methods for real time sound effect modulation based on attitude variations. The system may include one or more position sensors installed on a moving object, with the position sensors reporting positional data associated with the moving object. A memory may contain predetermined criteria for altering characteristics of a sound associated with the moving object, and a database may contain sound examples. A processor may receive the positional data from the position sensors and determine positional changes based on the data. The processor may fetch sound examples from the database and fetch predetermined criteria from the memory. The processor may modulate the sound examples based on positional changes according to the predefined criteria to produce modulated sound examples. The processor may aggregate the modulated sound examples to produce an aggregated modulated sound example. Speakers on the moving object may emit the aggregated modulated sound example.

16 Claims, 10 Drawing Sheets

SYSTEMS AND METHODS FOR REAL TIME SOUND EFFECT MODULATION BASED ON ATTITUDE VARIATIONS

FIELD

This application relates generally to the use of sound to enhance the human experience of interacting with objects and, more specifically, to systems and methods that can create specific sound effects with reference to the particular motion and orientation of an object in real time.

BACKGROUND

Sound is all around us, whether at work or play. It is not uncommon to see children playing with toys, moving them around with their hands while making sounds associated with the movement. For example, a child might pick up a toy plane, and while swinging it from side to side, use his or her mouth to make sounds that mimic engine noise. Clearly, sound can add "life" to an otherwise inanimate object.

Many toys are designed to be similar in appearance to objects and beings that exist in real life or are associated with fantasy. Examples of such toys could include stuffed animals, baby dolls, and model airplanes. In some cases, features producing sound may be added to such toys in order to increase realism and generally enhance the play experience.

While some toys in the related art may produce sound effects, the lack of coordination with the toy's motion and orientation results in less than the full play experience possible.

Further enhancement of the play experience may be achievable through the addition of sound features that are made to vary automatically, depending upon the position, orientation, and motion of the toy itself.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are systems and methods for real time sound effect modulation based on attitude variations. The method may include receiving positional data from one or more position sensors installed on a moving object. One or more processors may be used for determining one or more positional changes based on the positional data, and for fetching, from a memory, one or more sound examples corresponding to one or more themes associated with the moving object. The one or more processors may be used for modulating the one or more sound examples based on the one or more positional changes according to predefined criteria to produce one or more modulated sound examples. The one or more processors may be used for aggregating the one or more modulated sound examples to produce an aggregated modulated sound example. One or more speakers installed on the moving object may be used for emitting the aggregated modulated sound example.

In an example embodiment, the system may include one or more position sensors installed on a moving object, with the one or more position sensors operable to detect and report positional data associated with the moving object. There may be a memory operable to store predetermined criteria for altering characteristics of a sound associated with the moving object. There may be a database operable to store one or more sound examples. There may be a processor operable to receive the positional data from the one or more position sensors. The processor may be operable to determine one or more positional changes based on the positional data. The processor may be operable to fetch the one or more sound examples from the database, and may be operable to fetch the predetermined criteria from the memory. The processor may be operable to modulate the one or more sound examples based on the one or more positional changes according to the predefined criteria to produce one or more modulated sound examples. The processor may be operable to aggregate the one or more modulated sound examples to produce an aggregated modulated sound example. There may be one or more speakers to emit the aggregated modulated sound example.

Additional example embodiments may include a non-transitory computer-readable medium storing instructions, which when executed by one or more processors, perform the following operations. One of the operations to be performed may be to receive positional data from one or more position sensors installed on a moving object. Another operation may be to determine, by one or more processors, one or more positional changes based on the positional data. Another operation may be to fetch, from a memory, by the one or more processors, one or more sound examples corresponding to the one or more themes associated with the moving object. Another operation may be to modulate, by the one or more processors, the one or more sound examples based on the one or more positional changes according to predefined criteria to produce one or more modulated sound examples. Another operation may be to aggregate, by the one or more processors, the one or more modulated sound examples to produce an aggregated modulated sound examples. Another operation may be to emit, by one or more speakers installed on the moving object, the aggregated modulated sound examples.

Additional systems, methods, apparatuses, features, and aspects are realized through the techniques of various embodiments of the disclosure. Other embodiments and aspects of the disclosure are described in detail below and are considered a part of the claimed disclosure. Other embodiments and aspects can be understood with reference to the description and the drawings.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

Systems and methods for real time sound effect modulation based on attitude variations are described. A moving object may be equipped with one or more speakers, which emit sounds according to positional changes in the object's attitude or position. This may be achieved using a processor that receives positional data from position sensors, such as gyroscopes and accelerometers installed on the moving object, and uses the positional data to determine the occurrence of specific variations in attitude and/or position. The processor may access sound examples stored in a database and retrieve one or more sound examples corresponding to one or more themes associated with the moving object. The themes can be related to airplanes, trains, ships, motor cars, space ships, and so forth. For example, if the object is a toy police car, the sound examples can include static sound examples of motor, a siren tone, cruiser, and so forth. The processor may also access from memory predetermined criteria for altering such sounds to correspond with any of several specific variations in the attitude and/or position of the moving object. Using the predetermined criteria, the processor may modulate the sounds and combine modulated sound examples to create aggregated sounds appropriate for the specific motion of the moving object. The sounds may be emitted from the object's onboard speaker to correspond with the moving object's particular motion in real time.

Figure 1:
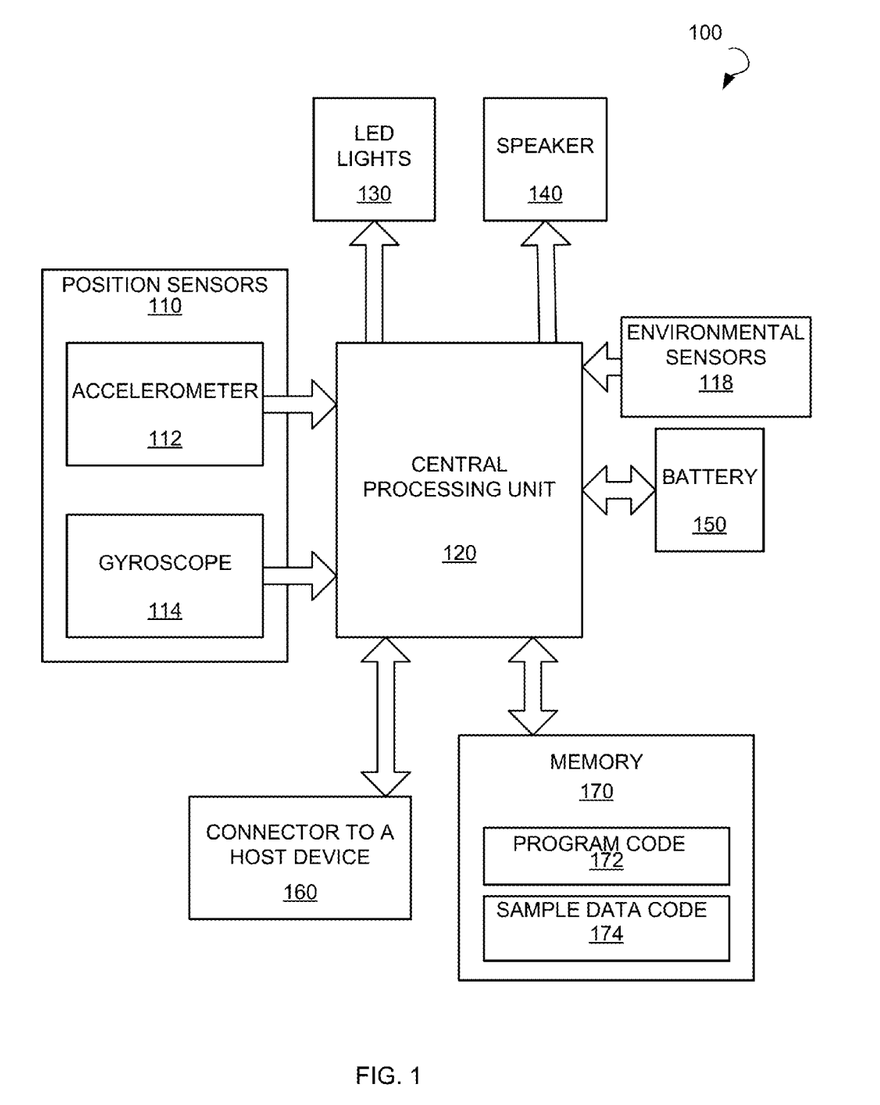
FIG. 1 is a block diagram illustrating an example embodiment of a system for producing specific sound effects with reference to the particular motion and orientation of a moving object in real time.

A variety of sound effects may be produced by using known modulation methods, such as varying the amplitude, frequency, or sampling rate of the sound, or applying various filters to modify its frequency content. The modulation of sound examples may also be based on other parameters such as environmental data, ambient temperature, light, and time. Referring now to the drawings, FIG. 1 illustrates a block diagram illustrating an example embodiment of a system 100 for producing specific sound effects with reference to the particular motion and orientation of a moving object in real time.

The system 100 may include one or more position sensors 110 such as a gyroscope 114 and/or an accelerometer 112, a central processing unit (CPU) 120, which is a programmable module that may manage and connect to other modules in the system 100 as well as implement instructions according to a set of rules in the form of a program code 172. Such program code 172 may reside in a memory 170 that may also store sample data code 174, such as prerecorded sound examples of various types and characteristics. For example, a white noise, single tone, hissing noise, engine noise, and so forth. The system 100 may further include one or more environmental sensors 118 configured to sense environmental data.

The system 100 may further include a battery 150 that may power the whole circuitry and a speaker 140 so that when one or more sound examples are fetched from the memory 170 they may be then modified and sent to the speaker 140 to be heard. In addition, the system 100 may include one or more LED lights 130 with various colors that may be controlled by the CPU 120 based on the set of rules depending on the position of the moving object or a predefined pattern. In certain embodiments, the system 100 may include a connector 160 designed to connect the system 100 to a host device.

The system 100 may alter the characteristics of a sound based on the set of rules that may be embedded in the memory 170 of the system 100 as a program code 172, and the database sound files may be stored in the memory 170. The changes to the sound may be made in real time and according to the set of rules stored in the memory 170. The CPU may consider inputs from one or more position sensors 110 and one or more environmental sensors 118 and, based on the set of rules, modify the sound examples prior to aggregating the altered sound examples and then sending them out to a digital to analog converter (DAC) and finally to a speaker 140. The same procedure may be also applied to the control and change of a number of LED lights 130 for further effects. The LED lighting effects may be based on the positional data from the position sensors 110, that is, one or more LED lights installed on the moving object may be synchronized with the motions of the moving object. For example, a blue light can indicate a roll to the far left and a red light can indicate a pitch downwards. The positional data from the position sensors 110 may be also used to control the rate of LED flashing or the brightness of the LED lights 130. For example, the LED lights 130 may get brighter when tilt to the side is greater.

Figure 2:
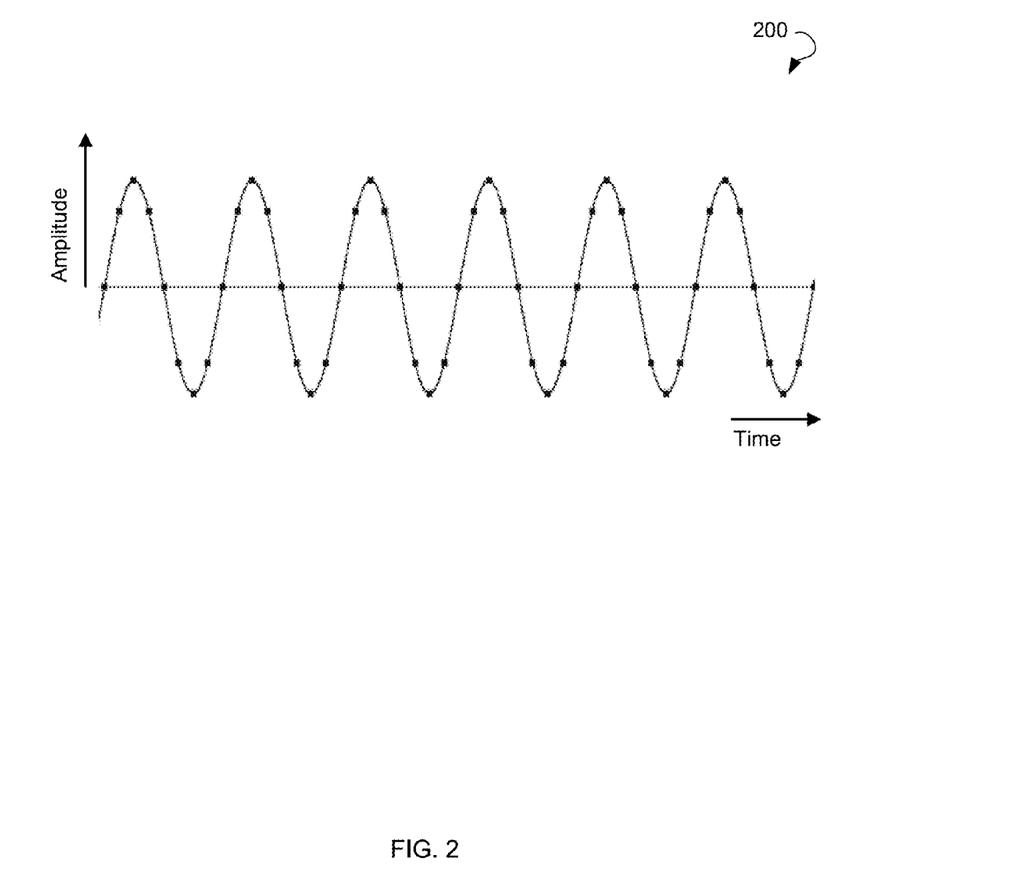
FIG. 2 illustrates a single tone sound as a simple sine wave that is sampled eight times per cycle, with both the amplitude and the frequency being held constant over time.

FIG. 2 illustrates a single tone sound as a simple sine wave 200 that may be sampled eight times per cycle, with both the amplitude and the frequency being held constant over time.

This is an example of a pure tone with a frequency given by dividing the sampling rate by sound examples in one cycle (i.e., if we assume a sampling rate of 8000 Hz and 8 sound examples per cycle, then the tone will be 1000 Hz). In the example shown, the tone may be static and may sound the same over time.

Figure 3:
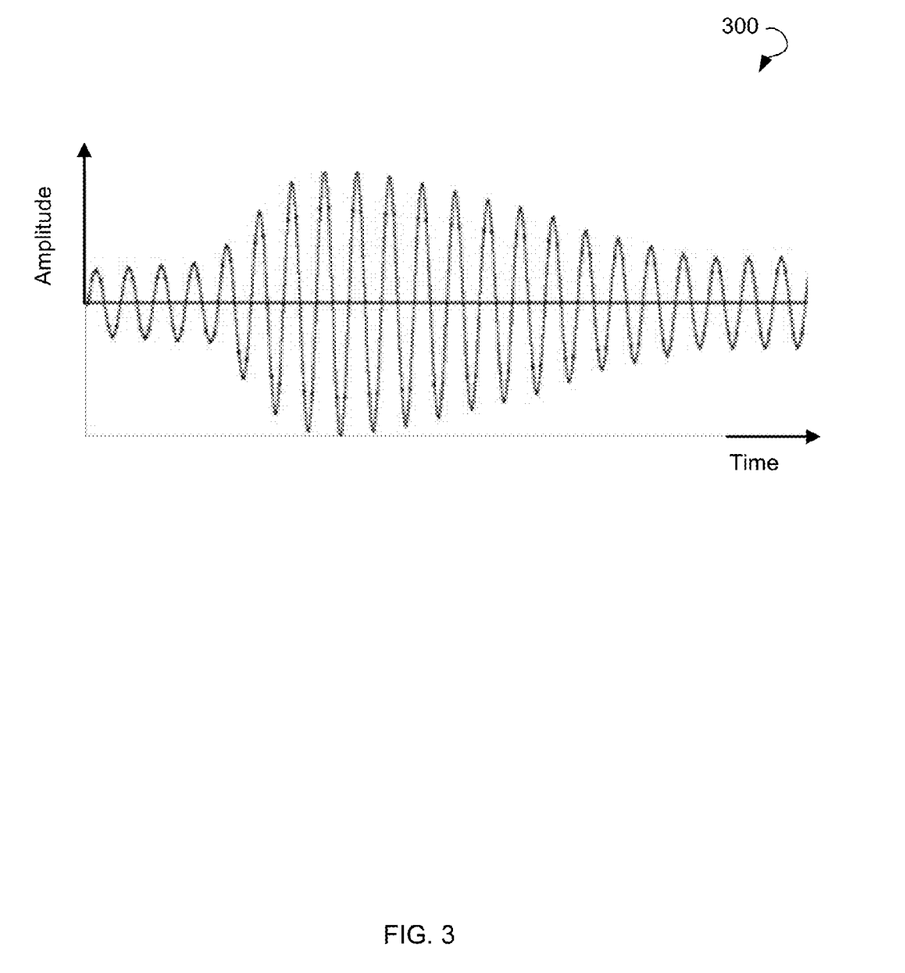
FIG. 3 illustrates a sound as a sine wave that is sampled eight times per cycle, with the frequency being held constant over time, but the amplitude being varied over time (amplitude modulation).

FIG. 3 illustrates a sound as a sine wave 300 that may be sampled eight times per cycle, with the frequency being held constant over time, but the amplitude being varied over time (amplitude modulation).

Sound is vibrations that travel through the air or another medium and can be heard when they reach a person's ear. As the waves change in amplitude and frequency, the waves sound different to human ears.

The process of transforming a static sound into a dynamic sound (i.e., a changing sound) is known as modulation. The modulation may be controlled by parameters that are derived outside of the sound source such as positioning, temperature, lighting levels, and so forth. According to the present disclosure, the CPU of the system may collect positional data from one or more position sensors and feed them to a method for modulating the sound examples. The techniques of transforming a static sound into a dynamic one may include: amplitude modulation (volume control), frequency content modifications, and sampling rate changes.

FIG. 3 shows the same sound as in FIG. 2 but with the amplitude varying according to some changes in envelope. This is known as amplitude modulation that causes the effect of volume change.

Figure 4:
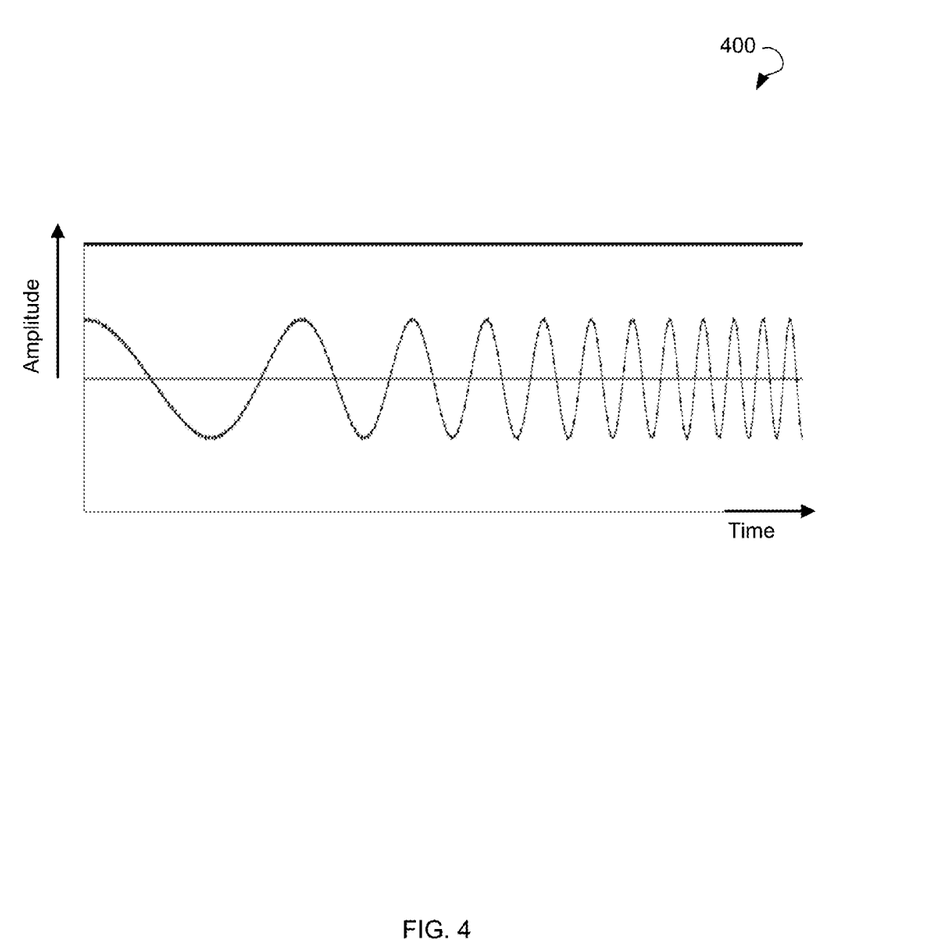
FIG. 4 illustrates a sound as a sine wave with the amplitude being held constant over time, but the frequency being varied over time (frequency modulation).

FIG. 4 illustrates a sound as a sine wave 400 with the amplitude being held constant over time, but the frequency being varied over time (frequency modulation).

FIG. 4 shows the same sound as in FIG. 3 but with the frequency of the tone linearly increasing in the time domain. The sound cycle is getting shorter towards the right side of the graph and the waveform is changing. This is known as a dynamic sound. Such sound, to a human ear, will sound as though the pitch or frequency of the sound is increasing. In this example, the tone may change from a lower frequency tone to a higher frequency tone.

In certain example embodiments, the frequency modulation may include changing the frequency of sound examples by a filtering process. Such filters may include high pass, low pass, band pass, or notch filters. The filtering process is similar to audio equalizers. Sound examples may be filtered so that features, such as base or treble, of the sound can be modified.

Figure 5:
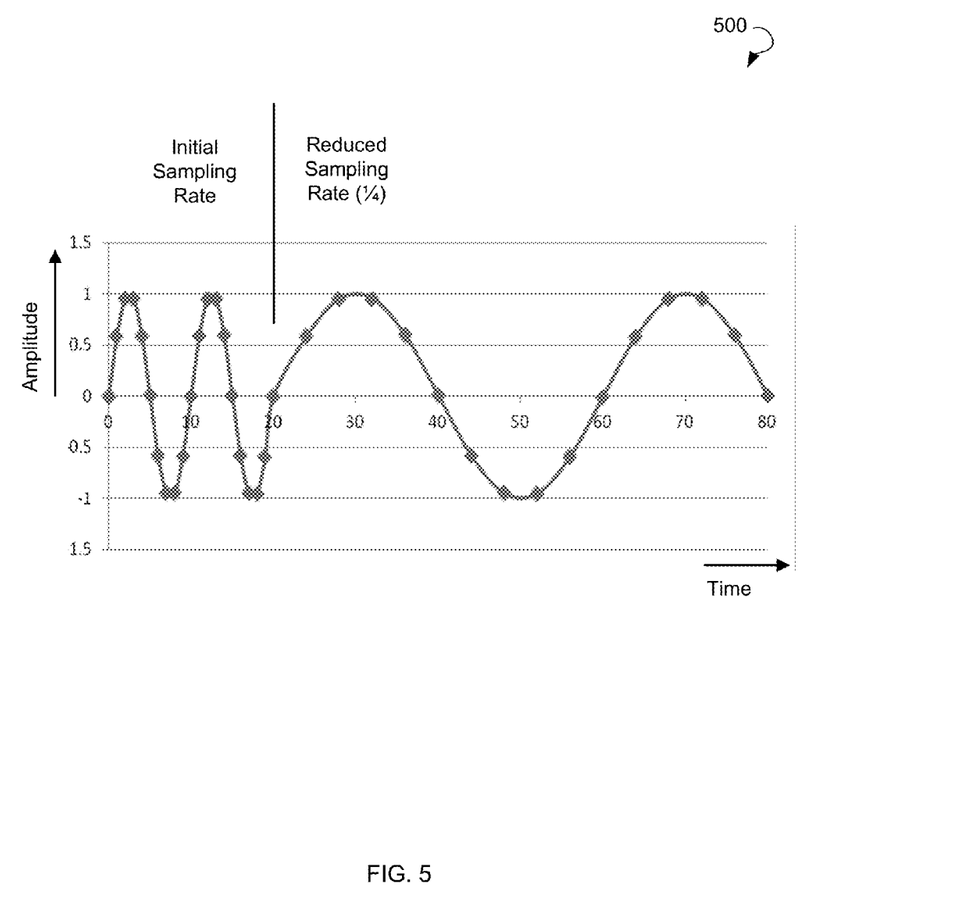
FIG. 5 illustrates a sound as a sine wave that is sampled ten times per cycle, holding the amplitude constant over time, but after two cycles, reducing the sampling rate by a factor of four, resulting in a corresponding reduction in the frequency by a factor of four.

FIG. 5 illustrates a sound as a sine wave 500 that may be sampled ten times per cycle holding the amplitude constant over time, but after two cycles reducing the initial sampling rate by a factor of four resulting in a corresponding reduction in the frequency by a factor of four. Intervals 0-10, 10-20, 20-30, 30-40, 40-50, 50-60, 60-70, and 70-80 indicate sound examples taken in the time interval.

A sampling rate may be the rate at which sound examples are sent out to a DAC, which may then be fed into a speaker. The sampling rate may influence the perception of sound waves. A perfect example of this may be the speed at which of vinyl records play. A slower speed may be transformed into a slow speaking/singing tone and a faster speed may have a higher pitch and fast cartoon-like effect. FIG. 5 shows a tone that after two cycles may have the sampling rate reduced by a factor of four, thus resulting in a sound that perceptually sounds like it is one quarter lower in frequency. Vice versa, if the sampling rate increases by a factor of "Δ", the perceived sound increases in frequency by the same factor "Δ."

Figure 6:
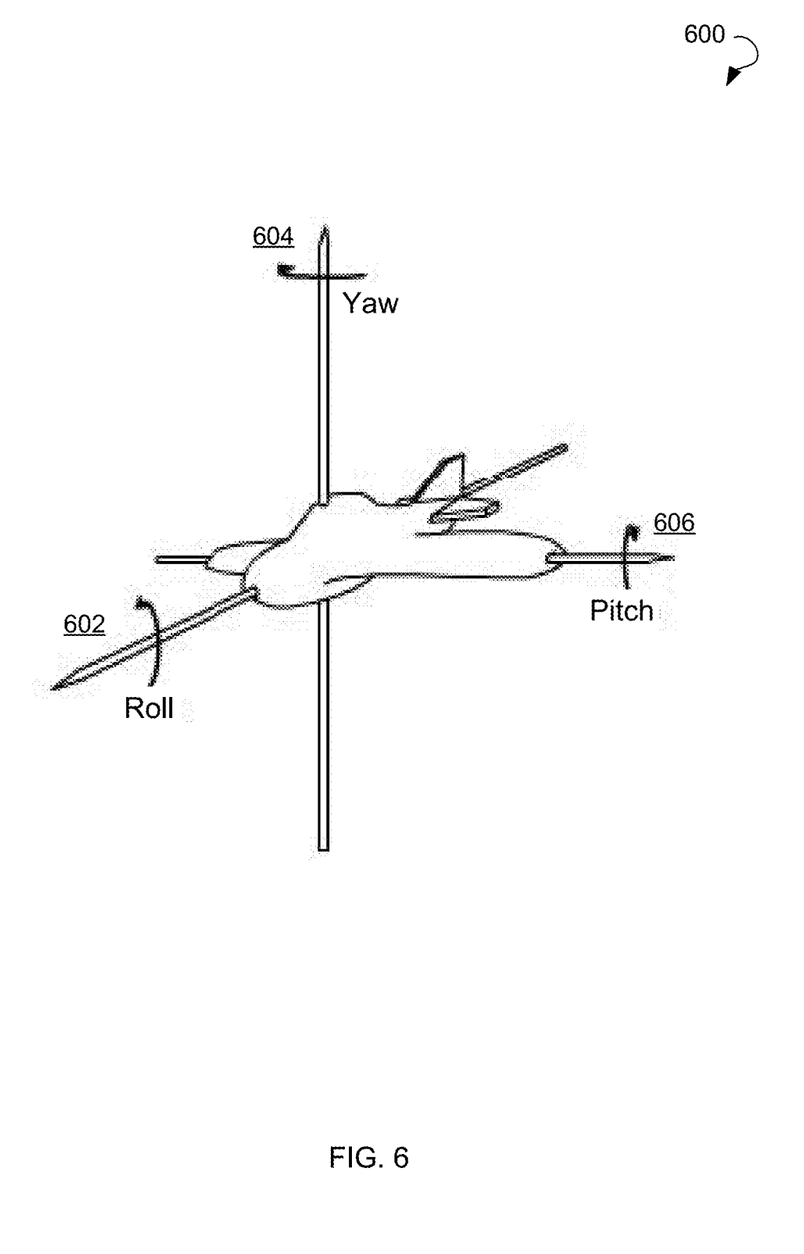
FIG. 6 illustrates the three degrees of freedom of the attitude of a moving object relative to itself, in the form of "roll," "yaw," and "pitch."

FIG. 6 illustrates an airplane model 600 with the three degrees of freedom of the attitude of the aero plane model 600 relative to itself, in the form of "roll" 602, "yaw" 604, and "pitch" 606.

The attitude of the aero plane model 600 may include the position of the aero plane model 600 in space given in three dimensional coordinates. By adding time, (i.e., measurements over time) the movement of the aero plane model 600, such as drifting, tilting, moving, and the like, may be dynamically measured.

In certain example embodiments, the attitude may be measured either electronically or mechanically using two techniques: an accelerometer and/or gyroscope.

The accelerometer may measure forces being applied to the aero plane model 600 as a result of its movement. In certain example embodiments, three accelerometers may be used to detect forces in three axes. Hence, the three accelerometers may detect the positional changes in a three-dimensional space.

The gyroscope may measure the angle of tilt of the aero plane model 600. For example, if the aero plane model 600 is placed on a table and is not moving, then the same readings will continue to be given out. Once the aero plane model 600 is tilted in any axis, then its reading may change to relate to the changes in angle.

In certain example embodiments, the accelerometer and gyroscope may be used in combination, both mechanically and electronically. The output positional data from both devices may be either digital or analog.

FIG. 6 shows the three axes of the aero plane model 600. The rotation of the aero plane model 600 around any of the three axes may be referred to as "roll" 602, "yaw" 604, and "pitch" 606. These parameters are the coordinates of the aero plane model 600 at a given point in time with respect to a reference point. A collection of data on any of these parameters, over a period of time, can be used to deduce the rate of change. These parameters do not project the coordinates of the aero plane model 600 but simply the dynamic changes or the positional behavior of the aero plane model 600 relative to itself.

In one example embodiment, the aero plane model 600 may be flipped on its roll axis from left to right. This may create a continuous change in the roll reading. Depending on the smoothness of the flip from one side to another, a plot similar to a sine wave as shown in the first half of FIG. 7 may be obtained. Another possibility may be a triangular wave reflecting linear changes of the angle and abrupt changes of direction once the aero plane model 600 reaches the extreme tilt positions. The amplitude of the sound may be related to the degree of change with respect to the reference point.

Figure 7:
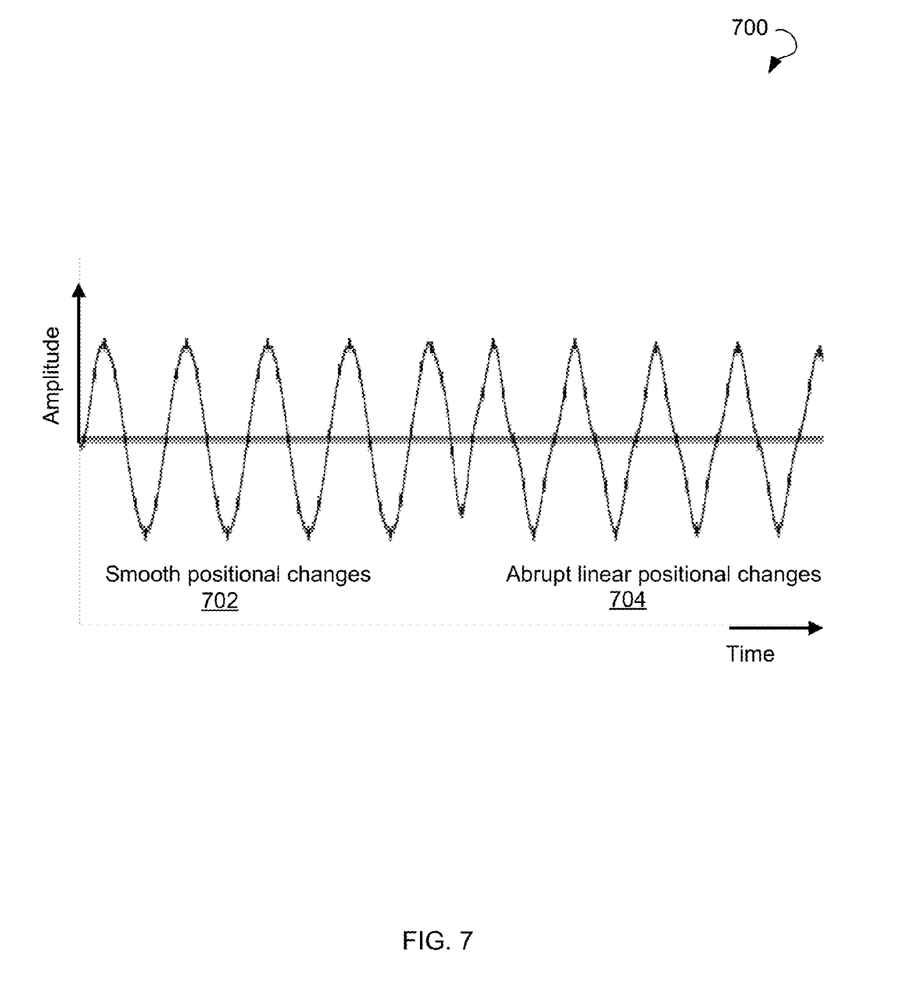
FIG. 7 illustrates a graph reflecting an example of "roll" tacking of a moving object, where the sine wave indicates a smooth rolling motion, and the triangular wave indicates an abrupt change.

FIG. 7 illustrates a graph 700 showing an example of "roll" tacking of a moving object, where the sine wave indicates smooth positional changes 702 of the moving object, and the triangular wave indicates abrupt linear positional changes 704 of the moving object.

Figure 8:
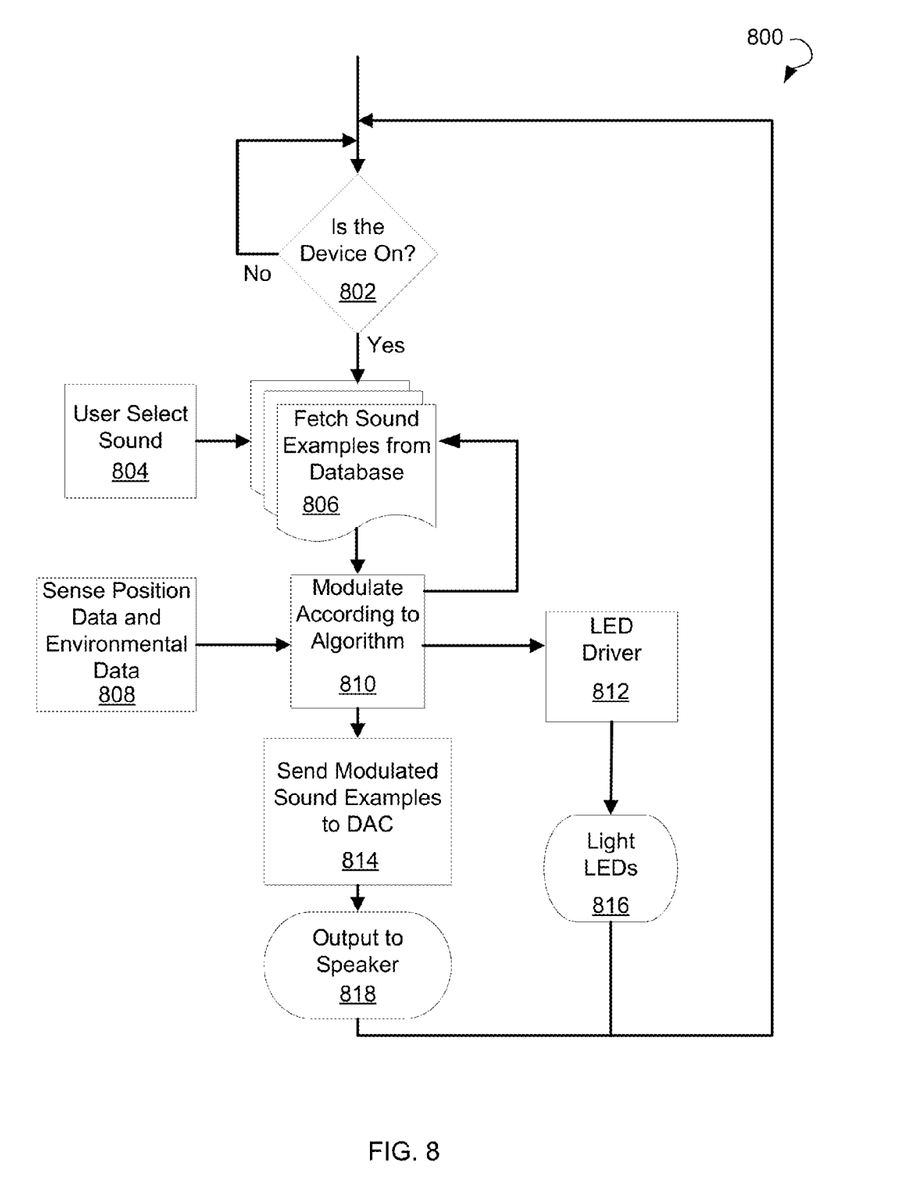
FIG. 8 is a flow chart illustrating an example embodiment of a real time sound modulation method for producing specific sound effects with reference to the particular motion and orientation of a moving object.

FIG. 8 is a flow chart 800 illustrating an example embodiment of a real time sound modulation method for producing specific sound effects with reference to the particular motion and orientation of a moving object.

The method may commence with determining whether the object is ON at operation 802. Once it is determined that the object is ON, one or more sound examples may be fetched from a database at operation 806. The selection of a sound example may be based on one or more themes associated with the moving object. For example, if the moving object is a toy airplane, the sound examples can include sounds imitating the real-life take-off or landing sounds of an airplane. The database may contain various sound files associated with the real-life objects stored in the memory of the system.

In one example embodiment, at operation 804, a user may select sound examples in order to match the sound with the theme associated with the moving object. The present system for producing specific sound effects can include a display for receiving user input selections. The display can display graphics, such as images of objects, but also can display text, such as titles of sound examples and/or themes. The display can include a touch-screen and the user can select the sound examples by touching objects on the touch-screen. Alternatively, the user can make selections using any other input device. The CPU can receive a user selection and fetches the selected sound examples from the database.

At operation 808, one or more position sensors installed on the moving object may collect positional data associated with the real-time motions of the moving object and one or more environmental sensors may collect environmental data. Based on the inputs from the position sensors and the environmental sensors and a set of preprogrammed rules, the sound examples may be modulated at operation 810. The modulated sound examples may be aggregated together and then sent to the DAC at operation 814 and finally output to speakers at operation 818.

In certain example embodiments, for further effect, at operation 816, LED lights on the moving object may be activated by a LED driver 812 based on the positional data received from the position sensors. For example, a blue light may indicate a roll to the far left and a red light may indicate a pitch downwards. The LED driver 812 may also use the positional data from the position sensors to control the rate of LED flashing or the brightness of the LED lights. For example, the LED lights 816 may get brighter when tilt to the side is greater.

Figure 9:
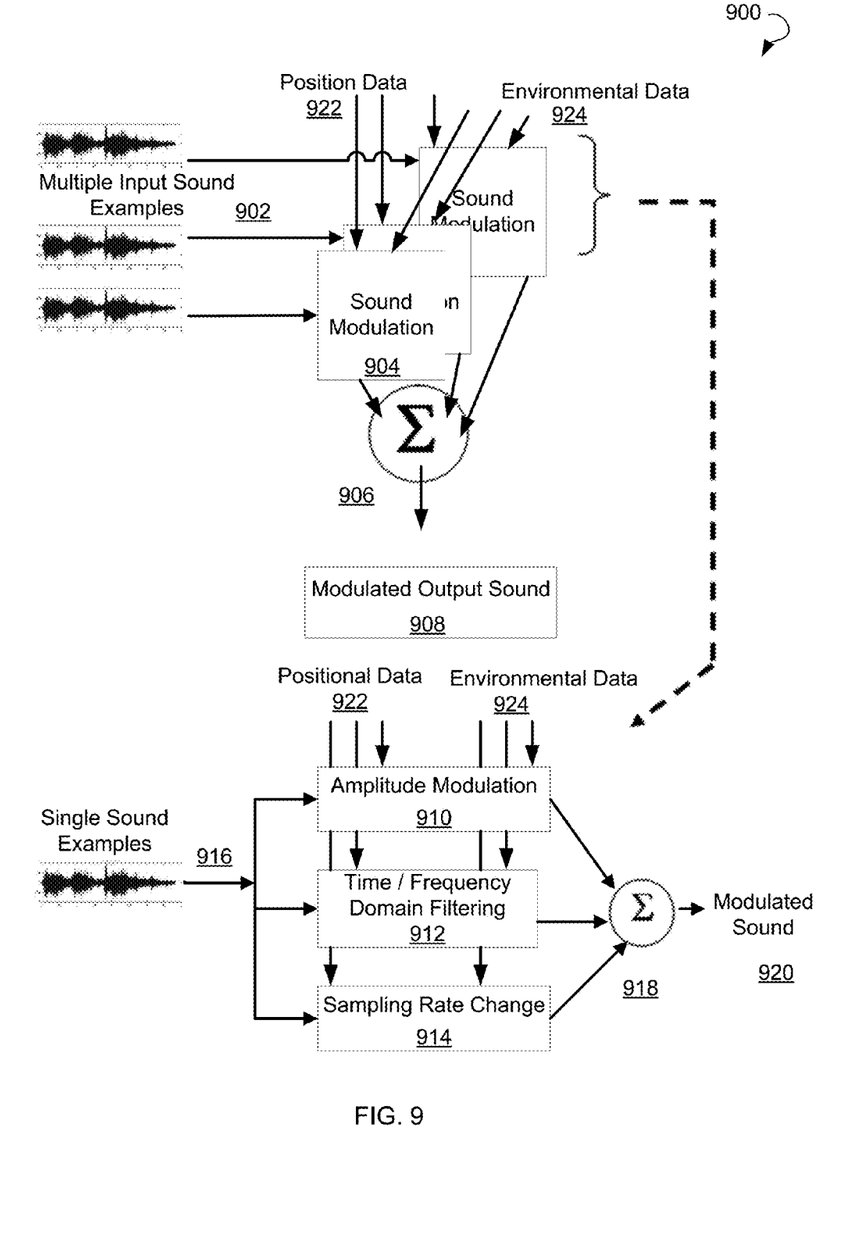
FIG. 9 is a block diagram illustrating an example embodiment of a sound modulation method for producing specific sound effects with reference to the particular motion and orientation of a moving object in real time.

FIG. 9 is a block diagram illustrating an example embodiment of a sound modulation method 900 for producing specific sound effects with reference to the particular motion and orientation of a moving object in real time.

The upper part of FIG. 9 shows a sound modulation of multiple input sound examples 902. According to this example embodiment, multiple input sound examples 902 may be fetched from the memory and sent out to a CPU, along with the positional data 922 and the environmental data 924, for the sound modulation to be performed at operation 904. Three modulation techniques, such as amplitude modulation, frequency modification, and sampling rate changes, may be applied to each of the sound examples. Once all audio examples have gone through the processes, they may be aggregated together at operation 906 to provide a modulated output sound 908 that produces the desired sound effect.

The lower part of FIG. 9 shows the sound modulation of single sound examples 916. According to this example embodiment, single sound examples 916 may be fetched from the memory and sent out to the CPU, along with the positional data 922 and the environmental data 924, for the sound modulation to be performed. Three possible modulation techniques, namely amplitude modulation 910, time/frequency domain filtering 912, and sampling rate change 914, may be applied to the single sound examples 916. Once the single sound examples 916 have gone through the three processes, the resulting modulated sound examples may be aggregated together at operation 918 to produce an aggregated modulated sound 920.

An example of the sound modulation is described below.

A child picks up and swings a toy plane with the system for real-time sound effect modulation embedded therein. Various sound examples may be stored in the memory of the system. Audio 1 sound example may be a white noise that may mimic the engine sound of a plane. Audio 2 sound example may be the sound of guns being fired from the barrel of a gun. The set of rules to module the sound may be the following:

Rule 1—as the plane turns to the sides increase the high frequencies of Audio 1 sound examples;

Rule 2—as the plane makes sharp turns use the position sensors to control the volume of the Audio 1 sound examples;

Rule 3—as the plane's nose is pointing down increase the rate of the bullets being fired by changing the rate of play back of Audio 2 sound examples.

The above rules may now be written in a program code to be embedded in the memory of the system and run on a CPU to give the desired sound effect every time the motion triggers the rules above. Accordingly, as the toy plane is moved around by the child it will make noises that mimic the flying of a war plane.

In certain example embodiments, audio files may be limited in play time length, and they may be replayed in a repeated loop to prolong the play time of the sound effects. For example, for the bullet firing, there may be only the length of time for one shooting sound. In order to hear more shootings, the file may be fetched and played over and over at a rate decided by the modulation algorithm.

In certain example embodiments, the sound files may be compressed for efficient storage in the memory.

Figure 10:
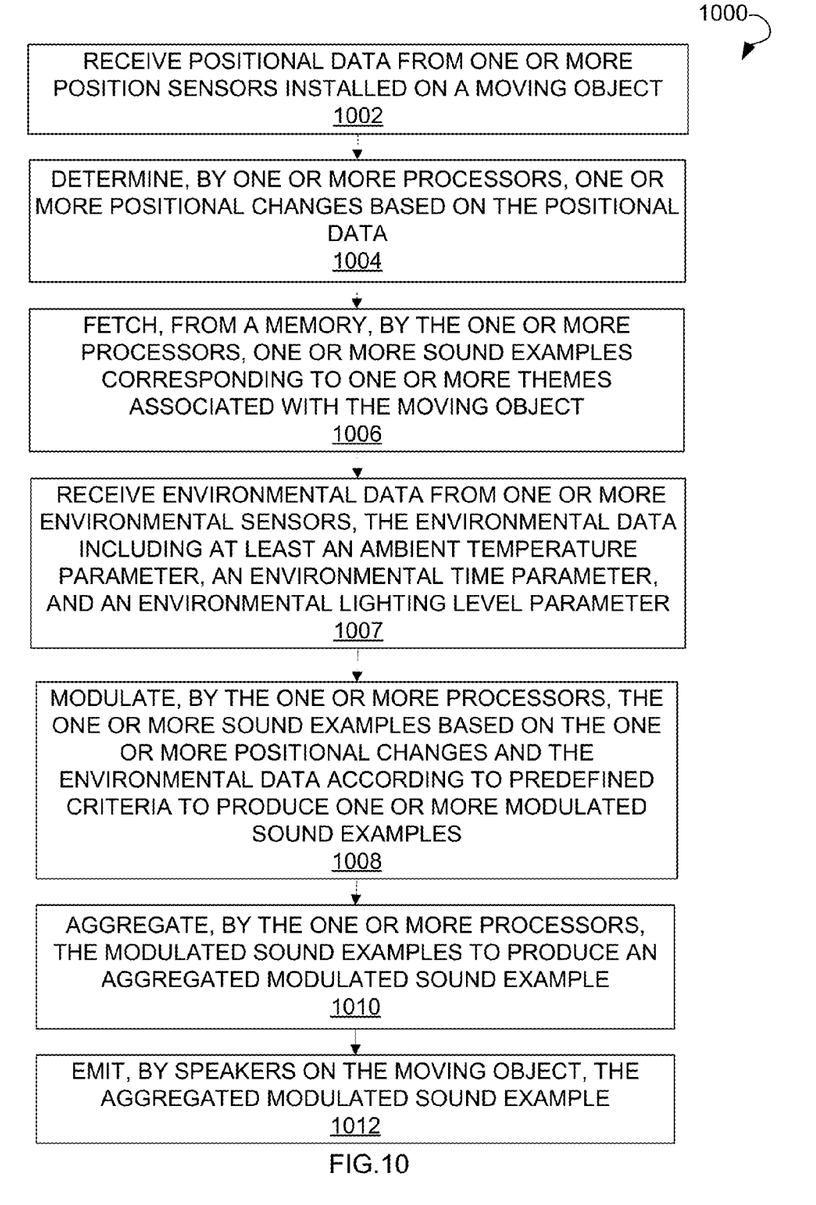
FIG. 10 is a flow diagram illustrating a method for real time sound effect modulation based on attitude variations, according to certain example embodiments.

FIG. 10 is a block diagram illustrating a method 1000 for real time sound effect modulation based on attitude variations, according to certain example embodiments.

The method 1000 may be performed by a logic that may include hardware (e.g., dedicated logic, programmable logic, and microcode), software (such as software run on a general-purpose computer system or a dedicated machine), or a combination of both. In one exemplary embodiment, the processing logic may reside at a CPU, which may be a programmable module that may manage and connect to other modules in the system as well as implement the instructions according to a set of rules in the form of a program code. Such program code may reside in a memory that also stores example recording sound data of various types and characteristics. Although various elements may be configured to perform some or all of the various operations described herein, fewer or more elements may be provided and still fall within the scope of various embodiments.

As shown in FIG. 10, the method 1000 may commence with receiving positional data from one or more position sensors installed on a moving object in step 1002. The positional data may include a three dimensional geometry position and/or acceleration data. The position sensors may include a gyroscope and/or accelerometer.

In step 1004, one or more positional changes may be determined based on the positional data. The positional changes may include changes over a period of time in a position of the moving object provided in three dimensional coordinates.

The method 1000 may further include fetching, from a memory, by the one or more processors, one or more sound examples corresponding to the one or more themes associated with the moving object, in step 1006. The one or more sound examples may include a white noise, a single tone, a hissing noise, an engine noise, and the like.

In step 1008, the one or more sound examples may be modulated based on the one or more positional changes according to predefined criteria to produce one or more modulated sound examples. The modulation may include an amplitude change, a frequency change, a content change, a sampling rate change, a high pass filtering, a low pass filtering, a band pass filtering, and a notch filtering. The sampling rate may be the rate at which sound examples are sent out to a DAC.

In certain example embodiments, the modulation of the one or more sound examples may further be based on one or more environmental parameters received from one or more environmental sensors in step 1007. The environmental parameters may include a temperature, a time, a lighting level, and the like.

The method 1000 may further include aggregating, by the one more processors, the one or more modulated sound examples to produce an aggregated modulated sound example, in step 1010.

In step 1012, one or more speakers installed on the moving object may emit the aggregated modulated sound example.

In certain example embodiments, the method 1000 may further include compressing the one or more sounds example for efficient storage in the memory.

In certain example embodiments, the method 1000 may further include looping the aggregated modulated sound for a prolonged play.

Thus, systems and methods for real time sound effect modulation based on attitude variations have been described. Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

What is claimed is:

1. A computer-implemented method comprising:
providing, via a user interface, a plurality of sound examples;
receiving, via the user interface, a user input, wherein the user input includes a selection of one or more sound examples from the plurality of sound examples, the selection of the one or more sound examples to be matched with one or more themes associated with a moving object;
based on the user input, matching the one or more sound examples with the one or more themes;
receiving positional data from one or more position sensors installed on the moving object;
determining, by one or more processors, one or more positional changes based on the positional data;
receiving environmental data from one or more environmental sensors, the environmental data including at least an ambient temperature parameter, an environmental time parameter, and an environmental lighting level parameter;
fetching, from a memory, by the one or more processors, the one or more sound examples corresponding to the one or more themes associated with the moving object;
modulating, by the one or more processors, the one or more sound examples based on the one or more positional changes and the environmental data according to predefined criteria to produce one or more modulated sound examples;
aggregating, by the one or more processors, the one or more modulated sound examples to produce an aggregated modulated sound example; and
emitting, by one or more speakers installed on the moving object, the aggregated modulated sound example.

2. The method of claim 1, wherein the positional data includes one or more of the following: a three dimensional geometry position and acceleration data.

3. The method of claim 1, further comprising synchronizing one or more LED lights installed on the moving object with motions of the moving object.

4. The method of claim 1, wherein the position sensors include one or more of the following: a gyroscope and an accelerometer.

5. The method of claim 1, wherein the modulation includes one or more of the following: an amplitude change, a frequency change, a content change, a sampling rate change, a high pass filtering, a low pass filtering, a band pass filtering, and a notch filtering.

6. The method of claim 5, wherein the sampling rate is the rate at which sound examples are sent out to a Digital to Analog Converter (DAC).

7. The method of claim 1, wherein the one or more positional changes include changes over a period of time in a position of the moving object provided in three dimensional coordinates.

8. The method of claim 1, further comprising compressing the one or more sound examples for efficient storage in the memory.

9. The method of claim 1, further comprising looping the aggregated modulated sound example for a prolonged play.

10. A system comprising:
one or more position sensors installed on a moving object, the one or more position sensors operable to detect and report positional data associated with the moving object;
a memory operable to store predetermined criteria for altering characteristics of a sound associated with the moving object;
a database operable to store a plurality of sound examples;
a processor operable to:
provide, via a user interface, the plurality of sound examples;
receive, via the user interface, a user input, wherein the user input includes a selection of one or more sound examples from the plurality of sound examples, the selection of the one or more sound examples to be matched with one or more themes associated with a moving object;
based on the user input, match the one or more sound examples with the one or more themes;
receive the positional data from the one or more position sensors;
determine one or more positional changes based on the positional data;
receive environmental data from one or more environmental sensors, the environmental data including at least an ambient temperature parameter, an environmental time parameter, and an environmental lighting level parameter;
fetch the one or more sound examples from the database;
fetch the predetermined criteria from the memory;
modulate the one or more sound examples based on the one or more positional changes and the environmental data according to the predefined criteria to produce one or more modulated sound examples; and
aggregate the one or more modulated sound examples to produce an aggregated modulated sound example; and
one or more speakers to emit the aggregated modulated sound example.

11. The system of claim 10, wherein the positional data includes one or more of the following: a three dimensional geometry position and acceleration data.

12. The system of claim 10, wherein the processor is further operable to synchronize one or more LED lights installed on the moving object with motions of the moving object.

13. The system of claim 10, wherein the position sensors include one or more of the following: a gyroscope and an accelerometer.

14. The system of claim 10, wherein the modulation includes one or more of the following: an amplitude change, a frequency change, a content change, a sampling rate change, a high pass filtering, a low pass filtering, a band pass filtering, and a notch filtering.

15. The system of claim 14, wherein the sampling rate is the rate at which sound examples are sent out to a Digital to Analog Converter (DAC).

16. A non-transitory computer-readable medium comprising instructions, which when executed by one or more processors, perform the following operations:
provide, via a user interface, a plurality of sound examples;
receive, via the user interface, a user input, wherein the user input includes a selection of one or more sound examples from the plurality of sound examples, the selection of the one or more sound examples to be matched with one or more themes associated with a moving object;
based on the user input, match the one or more sound examples with the one or more themes;
receive positional data from one or more position sensors installed on the moving object;
determine one or more positional changes based on the positional data;
receive environmental data from one or more environmental sensors, the environmental data including at least an ambient temperature parameter, an environmental time parameter, and an environmental lighting level parameter;

fetch, from a memory, one or more sound examples corresponding to the one or more themes associated with the moving object;

modulate the one or more sound examples based on the one or more positional changes and the environmental data according to predefined criteria to produce one or more modulated sound examples;

aggregate the one or more modulated sound examples to produce an aggregated modulated sound example; and emit, by one or more speakers installed on the moving object, the aggregated modulated sound example.

* * * * *